United States Patent
Dupuis et al.

(10) Patent No.: US 7,335,251 B2
(45) Date of Patent: Feb. 26, 2008

(54) METHOD FOR ENHANCING THE PHYSICO-CHEMICAL PROPERTIES OF BITUMEN COMPOSITIONS AND NOVEL BITUMEN COMPOSITIONS WITH ENHANCED PROPERTIES AND THEIR USES

(75) Inventors: Dominique Dupuis, Crepy en Valois (FR); Gilles Orange, Soisy sous Montmorency (FR)

(73) Assignee: Innophos, Inc., Cranbury, CT (US)

( * ) Notice: Subject to any disclaimer, the term of this patent is extended or adjusted under 35 U.S.C. 154(b) by 66 days.

(21) Appl. No.: 10/540,783

(22) PCT Filed: Nov. 21, 2003

(86) PCT No.: PCT/FR03/03446

§ 371 (c)(1),
(2), (4) Date: Mar. 1, 2006

(87) PCT Pub. No.: WO2004/048456

PCT Pub. Date: Jun. 10, 2004

(65) Prior Publication Data

US 2006/0169173 A1    Aug. 3, 2006

(30) Foreign Application Priority Data

Nov. 22, 2002   (FR) ................................. 02 14677

(51) Int. Cl.
*C08L 95/00* (2006.01)
*C09D 195/00* (2006.01)

(52) U.S. Cl. .............. 106/281.1; 106/277; 106/284.01; 106/284.06

(58) Field of Classification Search ................ 106/277, 106/281.1, 284.01, 284.06
See application file for complete search history.

(56) References Cited

U.S. PATENT DOCUMENTS

| | | | |
|---|---|---|---|
| 4,371,400 A | | 2/1983 | Mueller et al. |
| 4,410,589 A | * | 10/1983 | Muller et al. ............... 428/331 |
| 4,410,742 A | | 10/1983 | Mueller et al. |
| 5,304,243 A | | 4/1994 | Yamaguchi et al. |
| 5,667,577 A | * | 9/1997 | Chatterjee et al. .......... 106/277 |
| 6,103,000 A | * | 8/2000 | Custer ........................ 106/277 |
| 6,808,558 B2 | * | 10/2004 | Dupuis et al. ........... 106/284.1 |

FOREIGN PATENT DOCUMENTS

EP   048792   4/1982

OTHER PUBLICATIONS

International Search Report as published in WO2004/048456A3, Oct. 2004.

* cited by examiner

*Primary Examiner*—David M. Brunsman
(74) *Attorney, Agent, or Firm*—McCarter & English, LLP

(57) ABSTRACT

The invention concerns method for enhancing the physico-chemical properties of bitumen compositions and novel bitumen compositions with enhanced properties and their uses by mixing a functionalized amorphous silica made by combining amorphous silica with a coupling agent.

34 Claims, No Drawings

METHOD FOR ENHANCING THE PHYSICO-CHEMICAL PROPERTIES OF BITUMEN COMPOSITIONS AND NOVEL BITUMEN COMPOSITIONS WITH ENHANCED PROPERTIES AND THEIR USES

This application is a 371 of PCT/FR03/03446, filed 21 Nov. 2003.

The present invention concerns a process for improving the physicochemical properties of bitumen formulations as well as new bitumen formulations with improved properties and their uses, notably for the preparation of bituminous coatings for road paving.

The use of bitumen type materials is known, such as asphalt and maltha for paving, roofing materials, various coatings, mortar and curbs.

Bitumen formulations were prepared by adding suitable additives such as aggregates or charges to the bitumen type materials mentioned above. Nevertheless, such formulations present numerous problems when they are used as such for different applications: among other things can be mentioned a significant sensitivity to temperature, weak adherence with respect to aggregates, very average properties at low temperatures, poor resistance to abrasion, poor impact resistance.

For example, in the case of a roadbed, the main constituents are bituminous coatings which consist of 95% by weight of granules and 5% by weight of bitumen, which serves as a binder.

The role of this binder is predominant in the properties of the road which is submitted to three types of stresses of a mechanical nature: thermal fracture, fatigue and rutting.

At low temperature (about −10° C.), the binder, that is to say, the bitumen, vitrifies and becomes brittle. It can then form long transversal fissures due to thermal stress (heat fractures) which are micro-fissures due to the heterogeneity of the material.

At higher temperature (around 0° C.), the roadbed can still crack as a result of the effect of fatigue. The result is a multitude of fissures, mainly of the interconnected longitudinal type.

Finally, at even higher temperatures (around 60° C.), the bitumen passes from the solid state to the viscous state, becoming more and more fluid. Also, the repeated passage of heavy masses which consist of heavy-weight vehicles over the roadbed contributes to the deformation of the bitumen in a permanent manner, and by extension, the roadbed. This phenomenon is at the origin of ruts.

The binder ensures among other things the surface sealing of the roadbed, thereby protecting the substructures of the road.

The main characteristics required of a road and therefore of a bitumen formulation which serves as a binder are thus:

good resistance to cracking at low temperature (typically −15° C.), minimal deformation at high temperature (typically +60° C.).

good resistance to fatigue for the improvement of durability.

Another objective of the present invention is to provide a process for improving the rheological and mechanical properties of bitumen formulations.

Another objective of the present invention is to provide a process for improving the mechanical firmness of bitumen formulations at high temperatures.

Another objective of the present invention is to provide a process for improving the properties of bitumen formulations to provide ease of storage and a good redispersibility of the additives used in the bitumen formulations.

These objectives and others are attained by the present invention which involves, in effect, a process for improving the physicochemical properties of bitumen characterized by the fact that an appropriate quantity of amorphous silica ultimately made functional, is added to the bitumen formulation.

The present invention also concerns a bitumen formulation to be obtained by the process.

The present invention also concerns a hot mix preparation process which makes use of the bitumen formulation of the invention.

The present invention also concerns a cold mix preparation process which makes use of the bitumen formulation of the invention.

The present invention concerns above all a process for improving the physicochemical properties of bitumen, characterized by the fact that an appropriate quantity of amorphous silica ultimately made functional is added to the bitumen formulation.

The amorphous silica can be a natural silica or a synthetic silica such as precipitated silica, silica gels or combustion silicas.

Preferably, a precipitated silica is used. It could, for example, be Tixosil 38A, Tixosil 38D or Tixosil 365 silica from the RHODIA Corporation In particular the precipitated silica can be in the form of more or less spherical balls, notably of an average size of at least 80 microns, for instance, at least 150 microns, obtained by means of a blast pipe sprayer, as described, for example in the document EP 0018866. It could for example be the silica called Microperle. It could for example be a Tixosil 38X or Tixosil 68 silica from the RHODIA Corporation.

The precipitated silica could be a highly dispersible silica, such as the silica described in the documents EP 520862, WO 95/09127 or WO 95/09128, which facilitate its dispersion in bitumen and has a positive effect on the mechanical properties of the material obtained.

Document EP 520862 describes the precipitated silica more precisely, presenting an BET specific surface ranging from about 140 to 200 $m^2/g$, a CTAB specific surface ranging from about 140 to 200 $m^2/g$, an attrition rate of less than 20%, and a pore-volume distribution such that the pore-volume comprised by pores with a diameter ranging from 175 Å to 275 Å represents at least 60% of the pore-volume constituted by pores with diameters less than or equal to 400 Å.

Document WO 95/09127 describes more precisely a precipitated silica possessing:

a CTAB specific surface($S_{CTAB}$) ranging from 140 to 240 $m^2/g$, an ultrasound disagglomeration factor($F_D$) greater than 11 ml.

a median diameter (Ø50), after ultrasound disagglomeration of less than 2.5 µm, and present in at least one of the following forms: more or less spherical balls with an average size of at least 80 µm, powder with an average size of at least 15 µm, granules with a size of at least 1 mm.

Document WO 95/09128 describes more precisely a precipitated silica characterized by possessing.

a CTAB specific surface($S_{CTAB}$) ranging from 100 to 140 $m^2/g$, a pore-volume distribution such that the pore-volume constituted by the pores with a diameter ranging from 175 to 275 Å represents less than 50% of the pore-volume constituted by the pores with a diameter less than or equal to 400 Å.

a median diameter (Ø50), after ultrasound disagglomeration of less than 4.5 µm, and present in at least one of the following forms: more or less spherical balls with an average size of at least 80 µm, powder with an average size of at least 15 µm, granules with a size of at least 1 mm.

By way of an example of a highly dispersible silica, a Z1165 MP or a Z1115 MP silica from the RHODIA Corporation could notably be mentioned.

The amorphous silica could be a low water uptake silica. The "water uptake", which corresponds to the quantity of water contained in the sample compared to the weight of the sample in the dry state, after 24 hours at 20° C. and 70% relative humidity. By low water uptake is meant a water uptake less than 6%, and preferably less than 3%. These could be precipitated silica described in the patent application FR 01 16881 submitted on Dec. 26, 2001 by the RHODIA Corporation, pyrogenic silica or silica partially dehydroxylated by calcining or by surface treatment.

The amorphous silica of the invention can be made functional prior to its addition to the bitumen.

This can be effected by a silyation reaction with the aid of a coupling agent chosen from the silicon family. By way of example can be mentioned silicon, the alkylsilicons or functional silicon such as the amino-silicons, the thiol-silicons or the epoxy-silicons.

The quantity of coupling agent introduced into the amorphous silica ranges from 0.1 to 30% by weight in relation to the weight of the amorphous silica. Preferably, the quantity of coupling agent introduced into the amorphous silica ranges from 5 to 15% by weight in relation to the weight of the amorphous silica.

The silyation reaction, which is a grafting of silicon onto the silica can be effected in a hydro-alcoholic medium in the presence of a catalyst. This catalyst can be an acid such as acetic acid, or a base such as ammonia.

After the silyation reaction, the reaction medium is centrifuged. The mother liquors are eliminated and the residue is washed with distilled water.

On completion of the last centrifuging, the residue is dried. A powder is recovered with a proportion of coupling agent ranging from 0.5 to 30% by weight of coupling agent compared to the total weight of the functional silica.

The interest in using this amorphous silica ultimately made functional from the invention is that it is very stable in storage, easy to handle, it is very fluid, it doesn't clump up, and it disperses particularly well in bitumen formulations, which facilitates the implementation of formulation preparation processes for bitumen with improved performance and "hot" and "cold" bitumen coating preparation processes.

The silica ultimately made functional must be added to the bitumen formulation in a sufficient quantity.

In the sense of the present invention, a sufficient quantity means a quantity sufficient to significantly improve physicochemical properties of the bitumen formulations.

In general, the quantity of amorphous silica ultimately made functional introduced into the bitumen formulation ranges from 0.01 to 20% by weight of amorphous silica ultimately made functional, compared to the total weight of the bitumen formulation.

Preferably, the quantity of amorphous silica ultimately made functional introduced into the bitumen formulation ranges from 0.01 to 7% by weight of amorphous silica ultimately made functional compared to the total weight of the bitumen formulation.

It must be noted that the examples of bitumen to which the silica of the present invention can be added include the natural bitumens, the pyrobitumens and the artificial bitumens. The particularly preferred bitumens are those used for paving, such as asphalt or maltha. In an even more preferential manner, asphalt is used.

Three methods of preparation are possible for the incorporation of silica in the bitumen formulation.

The first method of preparation involves a process for improving the physicochemical properties of the bitumen formulation consisting of the following steps:

1—the bitumen formulation is heated to a temperature ranging from 120 to 190° C.

2—a sufficient quantity of amorphous silica ultimately made functional is added to the bitumen formulation from step 1 under agitation.

In the case of the preparation of the "hot" bitumen formulation, the silica can ultimately be made functional "in situ" in the bitumen formulation. That is, it is possible to add the coupling agent independently of the silica in step 2 of this process.

The present invention also concerns a bitumen formulation ultimately obtained by the process described above The present invention also concerns a hot mix preparation process which makes use of the bitumen formulation ultimately obtained by the above process.

This process includes a step supplementary to the preceding process which consists of adding, under agitation and at a temperature ranging from 120 to 190° C., granular materials to the bitumen formulation prior to, at the same time as, or after the addition of silica ultimately made functional from step 2.

In general, the granular materials are first heated to a temperature in excess of 120° C.

The present invention also concerns a bitumen formulation to be obtained by the process described above.

The second method of preparation possible for the incorporation of the amorphous silica ultimately made functional into the bitumen formulation is carried out at ambient temperature. This is the "cold" preparation process.

This process consists of the following steps:

1—A bitumen emulsion is prepared by mixing water, bitumen and an emulsifier at ambient temperature;

2—A sufficient quantity of amorphous silica ultimately made functional is incorporated in the bitumen emulsion from step 1 under agitation at ambient temperature;

3—the emulsion obtained in step 2 is spread to obtain a uniform coat of the mixture obtained in step 2;

4—the bitumen emulsion is broken down.

The present invention also concerns a bitumen formulation to be obtained by the process described above.

In the case of the preparation of the "cold" bitumen formulation, the silica can ultimately be made functional "in situ" in the bitumen formulation. That is, it is possible to add the coupling agent independently of the silica in step 2 of this process.

The present invention also concerns a "cold" mix preparation process which makes use of the bitumen formulation to be obtained by the above process.

This process includes a step supplementary to the preceding process which consists of adding, under agitation and at ambient temperature, granular materials to the bitumen formulation after the addition of silica ultimately made functional from step 2.

The present invention also concerns a bitumen formulation to be obtained by the process described above.

Finally, a third method of preparation is also possible which combines the two preceding "hot" and "cold" preparation methods.

This process includes the following steps
1—the bitumen formulation is heated to a temperature ranging from 120 to 190° C.;
2—a sufficient quantity of amorphous silica ultimately made functional is added to the bitumen formulation from step 1 under agitation;
3—the bitumen emulsion obtained in step 2 is prepared by mixing water, the said bitumen and an emulsifier;
4—the emulsion obtained in step 3 is spread to obtain a uniform coat of the mixture obtained in step 3;
5—the bitumen emulsion is broken up.

The present invention also concerns a "cold" mix preparation process which makes use of the bitumen formulation to be obtained by the above process.

This process includes a step supplementary to the preceding process which consists of adding, under agitation and at ambient temperature, granular materials to the bitumen emulsion obtained in step 3 of the process In the sense of the present invention, a sufficient quantity means a quantity sufficient to significantly improve physicochemical properties of the bitumen formulations.

In general, the quantity of amorphous silica ultimately made functional introduced into the bitumen formulation ranges from 0.01 to 20% by weight of amorphous silica ultimately made functional compared to the total weight of the bitumen formulation.

Preferably, the quantity of amorphous silica ultimately made functional introduced into the bitumen formulation ranges from 0.1 to 7% by weight of amorphous silica ultimately made functional compared to the total weight of the bitumen formulation.

The bitumen formulations of the invention can also contain other additives normally used in the bitumen domain.

In particular, an additive such as a plastomer or an elastomer, or any other chemical agent known to persons skilled in the art, in order to improve its physicochemical and its resistance to decohesion The emulsifiers used to emulsify the bitumen are the emulsifiers normally used by persons skilled in the art in this technical field.

The bitumen used can also be understood to be hot oxidized by contact with air.

The present invention will be explained in greater detail by reference to the examples below. It should be noted that terms "parts" and "%" appearing in the examples correspond to "parts by weight" and to "% by weight", respectively, in the absence of particular stipulations.

EXAMPLES

Example A

Preparation of a Bitumen Formulation

The silica used is a Z1165 MP silica from the RHODIA Corporation.

It is used "as is" or else it is subjected to treatment beforehand.

1) Preparation of the Functional Silica a) Bitumen with Epoxy Functionalised Silica.

50 g of Z1165 MP silica is placed in a reactor at 25° C. containing an initializer of 306.7 g of 20% ammonia, and 542 g of absolute ethanol and 229 g of distilled water, all under agitation at 500 RPM.

Using a drop-by-drop dispensing ampoule, 4 g of (3 glycidoxypropy)trimethoxysilicon in solution in 92 ml of absolute ethanol is added, while agitating the mixture. After the addition is completed, the mixture is ripened so that the particles are made to come into contact with the silicon for a total of 5 hours.

After ripening, the mixture is centrifuged and washed 5 times using the same volume of water. The cake recovered after the last centrifuging is air-dried.

dry extract: 92%
% C: 0.89 proportion of coupling agent in the powder: 2.3% by weight of silicon compared to the total weight of functionalised silica.

b) Bitumen with Aminopropyl Functionalized Silica 50 g of Z1165 MP silica is placed in a reactor at 25° C. containing an initializer of 306.7 g of 20% ammonia, and 542 g of absolute ethanol and 229 g of distilled water, all under agitation at 500 RPM.

Using a drop-by-drop dispensing ampoule, 4 g of aminopropyltricthoxysilicon in solution in 92 ml of absolute ethanol is added, while agitating the mixture. After the addition is completed, the mixture is ripened so that the particles are made to come into contact with the silicon for a total of 5 hours.

After ripening, the mixture is centrifuged and washed 5 times using the same volume of water. The cake recovered after the last centrifuging is air-dried.

dry extract: 94.2%
% C: 1.3
% N: 0.37 proportion of coupling agent in the powder: 6.5% by weight of silicon compared to the total weight of functionalized silica.

c) Bitumen with Thiol Functionalized Silica:

50 g of Z1165 MP silica is placed in a reactor at 25° C. containing an initializer of 306.7 g of 20% ammonia, and 542 g of absolute ethanol and 229 g of distilled water, all under agitation at 500 RPM.

Using a drop-by-drop dispensing ampoule, 0.5 g of mercaptopropyltriethoxysilicon DYNASYLAN 3201 from Hüls in solution in 92 ml of absolute ethanol is added, while agitating the mixture. After the addition is completed, the mixture is ripened so that the particles are made to come into contact with the silicon for a total of 5 hours.

After ripening, the mixture is centrifuged and washed 5 times using the same volume of water. The cake recovered after the last centrifuging is air-dried.

dry extract: 93.8%
% C: 0.17
% S: 0.1 proportion of coupling agent in the powder: 0.8% by weight of silicon compared to the total weight of functionalized silica.

2) Preparation of the Bitumen Formulation

A 70/100 (Pen) grade bitumen was used for the tests. Bitumen from SHELL Petit Couronne (France).

The bitumen is taken from a drum, and placed in a beaker: the beaker is then heated on a hotplate to 170° C.

The incorporation of the silica additive "as is" or ultimately made functional as per examples A1a) to c) is then carried out.

The mixture is then maintained at 170° C. for about 15 minutes while agitating vigorously by means of a rotary agitator (260 RPM). The temperature is strictly maintained below 180° C., in order not to alter the characteristics of the bitumen.

After malaxation the mixture is maintained for 5 minutes at about 170° C. while stirring slowly in order to eliminate air bubbles which might form.

The mixing is then terminated and the mixture is ready to be used.

Example B

Evaluation of Bitumen Formulations 1.2/Rheology Tests.

The rheologic characterization of additive-treated bitumen is made according to a procedure based on SHRP standards: Dynamic Shear Rheometer (DSR) tests (AASHTO TP5-98).

Rheology tests are carried out by ring shear using a Metravib viscoelastiometer.

The liquid bitumen is introduced into the shear cell which is heated to 110° C. beforehand. When the temperature has dropped to about 45° C., the bitumen no longer flows and the whole assembly is then dried and ready for testing.

The bitumen sample has a thickness of 1 mm over a height of 5 mm (cylindrical geometry).

The tests are conducted at different temperatures (30, 40, 50 and 60° C.) and in a range of frequencies which highlight the behavior of the material: 7.8-15.6-31.2-62.5-125 and 200 Hz.

1.3/Results Obtained

The results obtained relate to the Coulomb module (complex module) $G^*$, the elastic components $G'$ and viscous components $G''$, and the phase angle $\delta$.

These results can be represented either at iso-frequency as a function of the temperature, or as iso-temperature (isotherms) as a function of the frequency.

Five products were compared:
Reference bitumen (Shell 70-100)
silica additive-treated bitumen: 5% *
silica additive-treated bitumen made functional with epoxy 5% *
silica additive-treated bitumen made functional with epoxy 15% *
1—silica additive-treated bitumen made functional with aminopropyl 5% *
silica additive-treated bitumen made functional with thiol 5% *
* % by weight of additive compared to total weight of bitumen The following table (Table 1) summarizes the values measured at 60° C., for a frequency of 7.8 Hz.

TABLE 1

|  | $G^*$(Pa) | $G'$(Pa) | $G''$(Pa) | $\delta$ |
|---|---|---|---|---|
| Shell 70/100 | 10.950 | 880 | 10.950 | 85.4 |
| Shell + 5% silica | 17.315 | 1190 | 17.275 | 86.05 |
| Shell + 5% silica made functional with Epoxy | 17.596 | 1297 | 17.548 | 85.77 |
| Shell + 15% silica made functional with Epoxy | 45.727 | 5097 | 45.442 | 83.6 |
| Shell + 5% silica made functional with Aminopropyl | 18.457 | 1501 | 18.396 | 85.33 |
| Shell + 5% silica made functional with Thiol | 14.285 | 1091 | 14.243 | 85.62 |

The reinforcing (rigidity) effect contributed by the silica ultimately made functional additive powder can clearly be seen: increase in the $G^*$ complex module, and above all, in the elastic component $G''$.

The phase angle $\delta$ remains essentially constant, except for a level of 15% silica made functional with epoxy which translates into a more elastic behavior for the additive-treated bitumen.

The following table (Table 2) summarizes the values measured at 25° C. (and 40° C. for the phase angle $\delta$), for a frequency of 7.8 Hz The critical temperature Tc is determined on the basis of the criteria described in the SHRP procedure.

Tc is the temperature for which the relationship $G^*/\sin \delta$ is greater than 1000 Pa.

The thermal susceptibility of bitumen is determined by an index IS: thermal susceptibility index.

IS is defined by the slope of the straight log $G^*=f(T)$ at 7.8 Hz.

$$\frac{20 - IS}{10 + IS} = 50 \cdot |a|$$

TABLE 2

|  | $G^*$ ($10^6$ Pa) | $G'$ ($10^6$ Pa) | $G''$ ($10^6$ Pa) | $\delta$ 40° C. | Tc (° C.) | IS |
|---|---|---|---|---|---|---|
| Shell 70/100 (25° C.) |  | 1.02 | 2.35 | 78.0 | 74.5 | −3.18 |
| Shell + 5% silica (30° C.) | 1.26 | 4.31 | 1.18 | 76.2 | 79.0 | −2.88 |
| Shell + 5% silica made functional with Epoxy (25° C.) | 1.24 | 4.12 | 1.17 | 76.9 | 78.5 | −2.99 |
| Shell + 15% silica made functional with Epoxy (25° C.) | 6.74 | 3.72 | 5.62 | 72.6 | 85.7 | −2.70 |
| Shell + 5% silica made functional with Aminopropyl (30° C.) | 1.40 | 5.27 | 1.30 | 75.4 | 79.1 | −2.95 |
| Shell + 5% silica made functional with Thiol (30° C.) | 1.69 | 6.18 | 1.57 | 77.7 | 79.2 | −2.58 |

The critical temperature Tc is greatly increased in the presence of 5% silica.

In addition, a significant decrease in thermal susceptibility IS is noted.

The phase angle δ (at 40° C.) is significantly reduced, which results in a more elastic behavior in the additive-treated bitumen.

For an additive-treated bitumen with 15% by weight of silica made functional with epoxy, a very significant increase of the critical temperature Tc is observed. In addition, the phase angle is significantly reduced.

The invention claimed is:

1. A process for producing bitumen having improved physicochemical properties comprising the steps of:
   (a) combining amorphous silica with a coupling agent to produce a functionalized amorphous silica; and
   (b) mixing the functionalized amorphous silica with bitumen.

2. The process of claim 1, further comprising the step of heating the bitumen to a temperature of between about 120° C. to about 190° C. prior to mixing the functionalized amorphous silica with the bitumen.

3. The process of claim 2, wherein the amorphous silica is a natural silica or a precipitated silica.

4. The process of claim 3, wherein the amorphous silica is functionalized using a coupling agent selected from the group consisting of silicon, an alkylsilicon, an aminosilicon, a thiosilicon, an epoxysilicon and mixtures thereof.

5. The process of claim 4, wherein the quantity of functionalized amorphous silica mixed with the bitumen is between about 0.01% and about 20% by weight compared to the weight of the bitumen formulation.

6. The process of claim 5, wherein the quantity of functionalized amorphous silica mixed with the bitumen is between about 0.1% and about 7% by weight compared to the weight of the bitumen formulation.

7. The process of claim 5, wherein the amorphous silica is a precipitated silica in the form of essentially spherical balls having an average size of at least 80 microns.

8. The process of claim 7, wherein the amorphous silica is a low water uptake silica.

9. The process of claim 1, further comprising the step of mixing an aggregate material with the bitumen.

10. The process of claim 1, wherein the quantity of coupling agent combined with the amorphous silica is between about 0.1% to about 30% by weight compared to the weight of the amorphous silica.

11. The process of claim 10, wherein the quantity of coupling agent combined with the amorphous silica is between about 5% to about 15% by weight compared to the weight of the amorphous silica.

12. The process of claim 1, wherein the bitumen is selected from the group consisting of asphalt, maltha, a natural bitumen, a pyrobitumen, an artificial bitumen, or mixtures thereof.

13. A process for producing an improved bitumen based coating comprising the steps of:
   (a) mixing bitumen, water and an emulsifier at ambient temperature to form a bitumen emulsion;
   (b) adding to the bitumen emulsion an amorphous silica combined with a coupling agent to form a functionalized amorphous silica;
   (c) spreading the bitumen emulsion containing functionalized amorphous silica to obtain a uniform coating; and
   (d) breaking the bitumen emulsion.

14. The process of claim 13, wherein the amorphous silica is a natural silica or a precipitated silica.

15. The process of claim 14, wherein the amorphous silica is functionalized using a coupling agent selected from the group consisting of silicon, an alkylsilicon, an aminosilicon, a thiosilicon, an epoxysilicon and mixtures thereof.

16. The process of claim 15, wherein the quantity of functionalized amorphous silica mixed with the bitumen is between about 0.01% and about 20% by weight compared to the weight of the bitumen formulation.

17. The process of claim 16, wherein the quantity of functionalized amorphous silica mixed with the bitumen is between about 0.1% and about 7% by weight compared to the weight of the bitumen formulation.

18. The process of claim 16, wherein the amorphous silica is a precipitated silica in the form of essentially spherical balls having an average size of at least 80 microns.

19. The process of claim 18, wherein the amorphous silica is a low water uptake silica.

20. The process of claim 13, further comprising the step of mixing an aggregate material with the bitumen.

21. The process of claim 13, wherein the quantity of coupling agent combined with the amorphous silica is between about 0.1% to about 30% by weight compared to the weight of the amorphous silica.

22. The process of claim 21, wherein the quantity of coupling agent combined with the amorphous silica is between about 5% to about 15% by weight compared to the weight of the amorphous silica.

23. The process of claim 13, wherein the bitumen is selected from the group consisting of asphalt, maltha, a natural bitumen, a pyrobitumen, an artificial bitumen, or mixtures thereof.

24. A process for producing an improved bitumen based coating comprising the steps of:
   (a) heating a quantity of bitumen to a temperature of between about 120° C. and about 190° C.;
   (b) adding to the heated bitumen an amorphous silica combined with a coupling agent to form a functionalized amorphous silica;
   (c) mixing the bitumen/functionalized amorphous silica, water and an emulsifier to form a bitumen emulsion;
   (d) spreading the bitumen emulsion containing functionalized amorphous silica to obtain a uniform coating; and
   (e) breaking the bitumen emulsion.

25. The process of claim 24, wherein the amorphous silica is a natural silica or a precipitated silica.

26. The process of claim 25, wherein the amorphous silica is functionalized using a coupling agent selected from the group consisting of silicon, an alkylsilicon, an aminosilicon, a thiosilicon, an epoxysilicon and mixtures thereof.

27. The process of claim 26, wherein the quantity of functionalized amorphous silica mixed with the bitumen is between about 0.01% and about 20% by weight compared to the weight of the bitumen formulation.

28. The process of claim 27, wherein the quantity of functionalized amorphous silica mixed with the bitumen is between about 0.1% and about 7% by weight compared to the weight of the bitumen formulation.

29. The process of claim 27, wherein the amorphous silica is a precipitated silica in the form of essentially spherical balls having an average size of at least 80 microns.

30. The process of claim 29, wherein the amorphous silica is a low water uptake silica.

31. The process of claim 24, further comprising the step of mixing an aggregate material with the bitumen.

32. The process of claim 24, wherein the quantity of coupling agent combined with the amorphous silica is between about 0.1% to about 30% by weight compared to the weight of the amorphous silica.

33. The process of claim 32, wherein the quantity of coupling agent combined with the amorphous silica is between about 0.1% to about 30% by weight compared to the weight of the amorphous silica.

34. The process of claim 24, wherein the bitumen is selected from the group consisting of asphalt, maltha, a natural bitumen, a pyrobitumen, an artificial bitumen, or mixtures thereof.

* * * * *